United States Patent Office 3,440,194
Patented Apr. 22, 1969

3,440,194
WAX COMPOSITION CONTAINING ETHYLENE VINYL ACETATE OR ETHYLENE ETHYL ACRYLATE AND A GRAFT COPOLYMER OF ETHYLENE WITH MALEIC ACID
Frank J. Taranto, Flushing, and Herman F. Weindel, Uniondale, N.Y., assignors to Mobil Oil Corporation, a corporation of New York
No Drawing. Filed Oct. 20, 1964, Ser. No. 405,260
Int. Cl. C08f 29/50, 45/52
U.S. Cl. 260—28.5                    14 Claims

ABSTRACT OF THE DISCLOSURE

Coating compositions are provided comprising petroleum wax, an interpolymer selected from the group consisting of interpolymers of ethylene and vinyl acetate and interpolymers of ethylene and ethyl acrylate, and graft copolymers of polyethylene and a dicarboxylic acid or anhyride thereof.

---

This invention has to do with wax- and polymer-containing compositions for coating paper, cardboard, cartons and the like. More specifically, the invention is particularly directed to such compositions of exceptional heat seal strength characteristics.

Packaging of foodstuffs in recent years has given rise to a need for new containers adapted to meet a specific standard or adaptable for use under a diversity of severe conditions. Thus, paperboard cartons used for packaging of bacon and like products should be capable of being heat sealed and should have significant heat seal strength. That is, plies of paperboard suitably coated are held together under light pressure, as about ¼ to 3 pounds per square inch, and are heated to about 200–425° F. to seal the plies one to another. As contemplated herein, "significant heat seal characteristics" denote a seal strength value of at least about 75 grams per inch obtained when two 25 pound glassine (a thin, dense translucent paper) strips, previously coated and heat sealed to one another at a temperature from about 200° F. to about 250° F. by a heat sealer, are delaminated on an Instron tester at 70° F. and at a rate of 5 inches per minute. A suitable heat sealer is Model 12 AS, Sentinel Laboratory Heat Sealer, made by Packaging Industries.

Some wax-polymer coating compositions known to date have significant heat seal characteristics in addition to such other desired characteristics as: toughness, scuff resistance and initial gloss. Yet, such compositions fail to meet one or more other requirements. By way of illustration, blends of wax and homopolymers of ethylene, propylene, isobutylene and isoprene exhibit toughness, scuff resistance and intitial gloss; the same blends fail to have significant heat seal strength. In contrast, blends of wax and copolymers of ethylene and vinyl acetate or ethyl acrylate have significant heat seal strength; but such blends suffer from poor gloss retention, excessive softness and poor slip characteristics. Gloss retention is evidenced by the extent of material exuding from a coated carton after storage at 105° F. for at least one week.

It is an object of this invention, therefore, to provide modified wax coating compositions having significant heat seal characteristics, as defined above. Still another object is to provide such coating compositions which are hard, compatible, retain gloss, and have good slip characteristics. Additional objects will be apparent from the following description.

Accordingly, the compositions of this invention which meet the foregoing objects, comprise:

Petroleum wax
An interpolymer containing from about 77 to about 85 percent by weight of ethylene and from about 23 to about 15 percent by weight of vinyl acetate, or an interpolymer containing from about 70 to about 80 percent by weight of ethylene and from about 30 to about 20 percent by weight of ethyl acrylate, and
A graft copolymer comprising a dicarboxylic-acid-modified polyethylene, proportions of the named components being so balanced as to have a seal strength when applied to glassine of at least about 75 grams per inch.

Outstanding compositions are provided by balancing proportions in keeping with the following tabulation:

| Component: | Percent, weight |
|---|---|
| Petroleum wax | 47.5–82.5 |
| Copolymer | 10–40 |
| Graft copolymer | 5–15 |

It is desirable to incorporate a minor amount, from about 10 to about 500 parts per million, of a petroleum-wax-soluable, phenolic antioxidant in the compositions to provide protection against oxidation. Particularly suitable is 2,6-di-tertiarybutyl-p-cresol, marketed as Tenox BHT by Eastman Chemical. Another suitable antioxidant comprises a mixture of 2-tertiarybutyl-4-hydroxyanisole and 3-tertiarybuyl-4-hydroxyanisole, similarly marketed as Tenox BHA.

Petroleum waxes contemplated herein include paraffin waxes, microcrystalline waxes and intermediate waxes. Particularly preferred, however, are blends of paraffin and microcrystalline waxes.

Paraffin waxes used herein have a melting point from about 120° F. to about 160° F. Preferred, however, are those having a melting point above about 135° F., particularly for gloss stability purposes.

The microcrystalline wax, or mixtures of two or more of such waxes, are obtained from heavy distillate oils or residual lubricating oils by well-known precipitation procedures. The waxes are obtained from solvent solution by cooling the solution to a temperature range of about 40–60° F., the wax product melting at about 150–170° F. Conventional microcrystalline wax can be considered to be comprised of two components. A ceresin wax component is composed predominantly of normal and slightly branched paraffins, and has a melting point of the order of 180–200° F. The lower melting point plastic component, melting points being in the range of 150–180° F., is composed of highly branched and cyclic hydrocarbons. When one microcrystalline wax is present in the compositions of this invention, it is preferred that it have a melting point of the order of 165–170° F. and that it be a laminating grade. In general, then, laminating grades (150–170° F., melting point) are preferred; however, coating grades of microcrystalline wax can be used.

With regard to the interpolymer or mixture of interpolymers, a critical feature obtains in the content of unsaturated ester. As indicated, the interpolymer is formed of ethylene and vinyl acetate or ethyl acrylate. When vinyl acetate is present in the interpolymer or mixture of interpolymers, the monomer concentration thereof should not exceed 23 percent, by weight, the balance comprising ethylene. The monomer concentration of vinyl acetate, then, is from about 15 to 23 percent by weight. Thus, an individual vinyl acetate/ethylene interpolymer having a vinyl acetate concentration of 17–19 percent by weight can be used. So also can a mixture of this particular interpolymer and a related interpolymer in which the vinyl acetate is about 28 percent by weight, so long as the average vinyl acetate content is not in excess of 23 percent by weight.

Particularly preferred ethylene/vinyl acetate copolymers for the compositions of this invention are: one having an ethylene/vinyl acetate comonomer ratio of about 81–83/19–17 and a melt index of about 125–175, such as Elvax 420; and another having substantially the same comonomer ratio and a melt index of about 2.5–3.5, such as Elvax 460. Another such copolymer is DQD 6225 which has an ethylene/vinyl acetate comonomer ratio of about 82/18 and a melt index of about 145. When mixtures are used such that a copolymer of vinyl acetate content in excess of 23 percent is included, suitable ones are Elvax 220 and Elvax 250. Elvax 220 has a melt index of 125–175 and Elvax 250 a corresponding index of 12–18; each has an ethylene/vinyl acetate comonomer ratio of 71–73/29–27. Similarly, DQD 3269 can be used in such mixtures; this has an ethylene/vinyl acetate comonomer ratio of about 72/28 and a melt index of 17–23. The Elvax copolymers are made by E. I. du Pont de Nemours and the "DQD" copolymers are marketed by Union Carbide.

As indicated, interpolymers of ethylene and ethyl acrylate are also contemplated herein. These are characterized by an ethylene/ethyl acrylate comonomer ratio of about 70/30 to about 80/20. Typical of such copolymers are: Dow Chemical products EA 2018 and EA 3018, the former having a comonomer ratio of 80/20 and the latter a ratio of 70/30, with each having a melt index of 18; and Union Carbide products DPDB 6169 and DQDA 2100 Natural, the former having a comonomer ratio of 82/18 and a melt index of 6, and the latter being a purified form of the former. Particularly preferred is EA 3018.

A third component of the new compositions is a graft copolymer comprising a dicarboxylic-acid-modified polyethylene. The dicarboxylic acid modifier is unsaturated, being typified by maleic acid and fumaric acid. Preferably, the acid is maleic acid. The modifier represents a minor amount of the graft copolymer. It is to be understood, however, that the acid or anhydride thereof can be used to form the modified polyethylene. An outstanding material is a polyethylene modified with a minor amount of maleic acid, as marketed by Eastman Chemical as Epolene C–16. The latter has the following properties:

| | |
|---|---|
| Molecular weight, number average, approx. | 7,000 |
| Viscosity, Brookfield, cps. 149° C. | 12,500 |
| Tensile strength, p.s.i. | 800 |
| Ring & ball softening point (ASTM D–36–26), ° C. | 106 |
| Penetration hardness, tenths of mm. (100 g./5 sec./25° C.) | 5 |

The graft copolymers can be formed by methods well known in the art, such as those shown in the text "Block and Graft Copolymers," of Burlant and Hoffman; Reinhold; 1960.

Still other adjuvants can be included in the new compositions to impart their expected properties, without detracting from the properties achieved with the components required, namely: petroleum wax, interpolymer and graft copolymer. These include: polyethylene, polyisobutylene, butyl rubber, slip agents such as 9-octadecenamide, and resinous materials such as polyterpenes and pentaerythritol esters of rosin.

In Table I below, compositions of this invention and related compositions are shown in order to illustrate the unusual and critical nature of the new compositions. Seal strength on glassine was determined by the technique described above. Gloss stability was determined by noting the extent of material exuding to the coating surface from a carton coated with a composition after having been maintained in an oven for 7 days at 105° F. Compatibility was determined by allowing the blends to stand without agitation in an oven at 300° F. for the time intervals indicated.

The results are shown in Table I following.

TABLE I

| Run | 1 | 2 | 6 | 7 | 8 | 9 | 11 | 12 | 13 |
|---|---|---|---|---|---|---|---|---|---|
| Composition: | | | | | | | | | |
| Paraffin Wax, 150° F., M.P. | 55 | 55 | 55 | 55 | 55 | 55 | 55 | 55 | 55 |
| Microcrystalline Wax | 10 | 10 | 10 | 10 | 10 | 10 | 10 | 10 | 10 |
| Copolymer 1 [a] | 25 | 20 | 35 | | 25 | 25 | | | 25 |
| Copolymer 2 [a] | | | | | | | | | |
| Copolymer 3 [a] | | | | | | | | | |
| Copolymer 4 [a] | | | | | | | | | |
| Graft Copolymer 1 [a] | 10 | 15 | | 35 | | | 10 | 10 | 10 |
| Polyethylene [b] | | | | | 10 | | | 25 | |
| Oxidized Polyethylene [c] | | | | | | 10 | 25 | | |
| Copolymer 5 [a] | | | | | | | | | |
| Copolymer 6 [a] | | | | | | | | | |
| Compatability at 300° F.: | | | | | | | | | |
| 2½ days | Clear | Clear | Clear | Clear | Clear | Clear | Clear | Clear | Slight haze. |
| 4½ days | do | do | do | do | do | do | do | do | Do. |
| Gloss Stability | Excellent | Excellent | Poor (massive exudation). | Excellent | Excellent | Excellent | Excellent | Excellent | Satisfactory. |
| Seal Strength on Glassine, gm./in | 124 | 101 | 9 | 40 | 8 | 71 | 17 | 44 | 172. |

| Run | 14 | 15 | 16 | 18 | 20 | 21 | 22 | 23 |
|---|---|---|---|---|---|---|---|---|
| Composition: | | | | | | | | |
| Paraffin Wax, 150° F., M.P. | 55 | 55 | 55 | 55 | 55 | 55 | 55 | 55 |
| Microcrystalline Wax | 10 | 10 | 10 | 10 | 10 | 10 | 10 | 10 |
| Copolymer 1 [a] | | | 10 | 13 | | | | |
| Copolymer 2 [a] | | | | | | | | |
| Copolymer 3 [a] | | | | 12 | 35 | | | |
| Copolymer 4 [a] | 25 | | | | | | | |
| Graft Copolymer 1 [a] | 10 | 25 | 10 | | 10 | 10 | 25 | |
| Polyethylene [b] | | | | | | | | |
| Oxidized Polyethylene [c] | | | | | | | | |
| Copolymer 5 [a] | | | | | | 25 | | |
| Copolymer 6 [a] | | | | | | | 10 | 35 |
| Compatability at 300° F.: | | | | | | | | |
| 2½ days | Separates into 2 phases. | Clear | Hazy | Clear | Clear | Clear | Clear | Clear. |
| 4½ days | do | do | do | do | do | do | do | Do. |
| Gloss Stability | Poor (massive exudation). | Excellent | Satisfactory | Poor (massive exudation). | Excellent | Excellent | Excellent | Excellent. |
| Seal Strength on Glassine, gm./in | 108 | 64 | 137 | 160 | 175 | 203 | 80 | 8. |

[a] Copolymer 1=Elvax 420; Copolymer 2=Elvax 460; Copolymer 3=Elvax 220; Copolymer 4=Elvax 260; Copolymer 5=EA 2018; Copolymer 6=EA 3018; Graft Copolymer 1=Epolene C–16.

[b] Epolene N–10, molecular weight 1,500 (number average).
[c] AC 629; oxidized polyethylene.

Results given in Table I reveal that the compositions of Run Nos. 1 and 2, typical of the new compositions, have unusually high seal strength values, 124 and 101, respectively. By way of comparison, Run No. 6 indicates that the omission of a graft copolymer and a corresponding increase in copolymer (or interpolymer) content results in almost a complete loss in seal strength and loss in gloss. Run No. 7 indicates that omission of the copolymer and a corresponding increase in a graft copolymer concentration results in a substantial loss in seal strength. Thus, a comparison of Run Nos. 1, 6 and 7 would indicate that the seal strength value expected by modification of the compositions of Run Nos. 6 and 7 would be of the order of 50; unexpectedly, it is 124. Moreover, the composition of Run No. 1 is marked by good compatibility and excellent gloss stability.

Run No. 8 shows that replacement of the graft copolymer with a like amount of polyethylene, results in almost complete loss in seal strength.

Run No. 9 reveals that substitution of an oxidized polyethylene for a like amount of graft copolymer causes a material loss in seal strength. However, a distinct deficiency of the composition of Run No. 9 is its undesirable odor, imparted by the oxidized polyethylene. This makes the composition unsuitable for use as a coating for a food package.

Run No. 11 shows that omission of a copolymer from the composition of Run No. 1 and replacement with a like amount of the oxidized polyethylene, results in almost complete loss of seal strength.

Run No. 12 can be compared with Run No. 1, since polyethylene is used in place of the copolymer. Here again, seal strength is unsatisfactory.

Run No. 13 shows another composition of the invention, the composition being marked by an excellent seal strength value of 172.

Run No. 14 is compared with Run No. 1, since the copolymer used has a vinyl acetate content of 28 percent by weight. While a significant heat seal value is obtained, gloss stability is poor as evidenced by massive exudation, and the composition is marked by incompatibility.

Run No. 15 shows that reversing of the concentrations of copolymer and graft copolymer, thereby providing an excess of the latter, produces a seal strength only half as great as in Run No. 1.

Run No. 16 illustrates the use of a mixture of copolymers, one having a vinyl acetate content of about 17–19 percent and the other of about 28 percent, and the mixture having an average of 23 percent. Excellent seal strength is realized.

Run No. 18 illustrates that a composition containing a copolymer of 28 percent vinyl acetate, and in which a graft copolymer is not present, has a most satisfactory seal strength value. However, massive exudation evidences unsatisfactory gloss retention.

Run Nos. 20, 21 and 22 illustrate other compositions contemplated herein. The copolymers used comprise ethyl acrylate and ethylene. Comparison of Run Nos. 21 and 22 shows that reversal of the copolymer and graft copolymer concentrations causes a decrease in seal strength, yet both values are satisfactory.

Run No. 23 illustrates that a composition containing a large concentration of ethyl acrylate copolymer and no graft copolymer has substantially no seal strength.

The coating compositions of this invention are particularly useful in folding carton applications, especially for packaging of butter, oleomargarine, ice cream, frozen foods, bacon and related meat products. They are also useful for coating of paper, film, foil and other substrates. Other uses include curtain coating and lamination of a variety of materials.

This invention has been described with reference to preferred compositions and components therefor. However, it is to be understood that departure from the preferred embodiments can be made within the scope of the specification and claims.

We claim:
1. A coating composition comprising in approximate percent by weight:

Petroleum wax having a melting point from
  about 120° F. to about 160° F. _____ 47.5–82.5
An interpolymer selected from the group consisting of an interpolymer containing from
  about 77 to about 85 percent by weight of
  ethylene and from about 23 to about 15 percent by weight of vinyl acetate, and an interpolymer containing from about 70 to about
  80 percent by weight of ethylene and from
  about 30 to about 20 percent by weight of
  ethyl acrylate _____ 10–40
A graft copolymer comprising Polyethylene
  modified with a minor amount of maleic acid _____ 5–15 proportions of the named components being so balanced that the composition has a seal strength when applied to glassine of at least about 75 grams per inch.

2. A composition as defined by claim 1 wherein the petroleum wax is a paraffin wax having a melting point above about 135° F.

3. A composition as defined by claim 1 wherein the petroleum wax is a paraffin wax having a melting point of about 150° F.

4. A composition as defined by claim 1 wherein the petroleum wax comprises a mixture of a paraffin wax having a melting point above about 135° F. and a laminating-grade microcrystalline wax having a melting point from about 150° F. to about 170° F.

5. A composition as defined by claim 4 wherein the microcrystalline wax has a melting point of about 165° F.

6. A composition as defined by claim 1 wherein the interpolymer has a comonomer ratio, weight percent, ethylene/vinyl acetate of about 82/18, and a melt index of 125–175.

7. A composition as defined by claim 1 containing a mixture of interpolymers of ethylene and vinyl acetate, the vinyl acetate monomer content, weight percent, of the mixture being at least about 15 and up to about 23.

8. A composition as defined by claim 1 wherein the interpolymer has a comonomer ratio, weight percent, ethylene/ethyl acrylate of about 70/30 and a melt index of about 18.

9. A composition as defined by claim 1 wherein the graft copolymer comprises polyethylene modified with about 0.7 percent, by weight of maleic acid.

10. A composition as defined by claim 1 wherein the graft copolymer has a molecular weight of about 7000.

11. A coating composition comprising in approximate percent by weight:

Paraffin wax, M.P., 150° F. _____ 55
Microcrystalline wax, M.P., 165–170° F. _____ 10
An interpolymer as defined in claim 1 and having a
  comonomer ratio, weight percent, ethylene/vinyl
  acetate of about 82/18 and a melt index of
  125–175 _____ 25
A graft copolymer as defined in claim 1 _____ 10

12. A coating composition comprising in approximate percent by weight:

Paraffin wax, M.P., 150° F. _____ 55
Microcrystalline wax, M.P., 165–170° F. _____ 10
An interpolymer as defined in claim 1 and having a
  comonomer ratio, weight percent, ethylene/ethyl
  acrylate of about 70/30 and a melt index of about
  18 _____ 25
A graft copolymer as defined in claim 1 _____ 10

13. A coating composition comprising in approximate percent by weight:

| | |
|---|---|
| Paraffin wax, M.P., 150° F. | 55 |
| Microcrystalline wax, M.P., 165–170° F. | 10 |
| A graft copolymer as defined in claim 1 | 10 |
| A mixture of about equal percentages of an interpolymer having a comonomer ratio, weight percent, ethylene/vinyl acetate of about 82/18 and a melt index of about 125–175, and of an interpolymer having a comonomer ratio, weight percent, ethylene/vinyl acetate of about 72/28 and a melt index of about 125–175 | 25 |

14. A coating composition as defined by claim 1 containing from about 10 to about 500 parts per million of a petroleum-wax-soluble, phenolic antioxidant.

References Cited

UNITED STATES PATENTS

| | | | |
|---|---|---|---|
| 2,766,214 | 10/1956 | Erchak | 260—28.5 |
| 2,877,196 | 3/1959 | Reding | 260—28.5 |
| 3,025,167 | 3/1962 | Butler | 260—28.5 |
| 3,146,214 | 8/1964 | Jakaitis et al. | 260—28.5 |
| 3,201,498 | 8/1965 | Brunson et al. | 260—897 |
| 3,355,405 | 11/1967 | Tyran | 260—28.5 |

FOREIGN PATENTS 643,353    2/1964    Belgium.

OTHER REFERENCES

Epolene C–16 Technical Data Publication TDS No. F–128, 6 pages (1963) Eastman Chemical Products, Inc.

Eastman Technical Data Epolene C–16 as a Petroleum Wax Modifier TDS No. F–129, February 24, 1964, 5 pp.

MORRIS LIEBMAN, *Primary Examiner.*

H. S. KAPLAN, *Assistant Examiner.*

U.S. Cl. X.R.

260—897